March 1, 1955     S. STONE     2,702,964
JET OPERATED ANIMATED WHISTLE
Filed Sept. 23, 1953
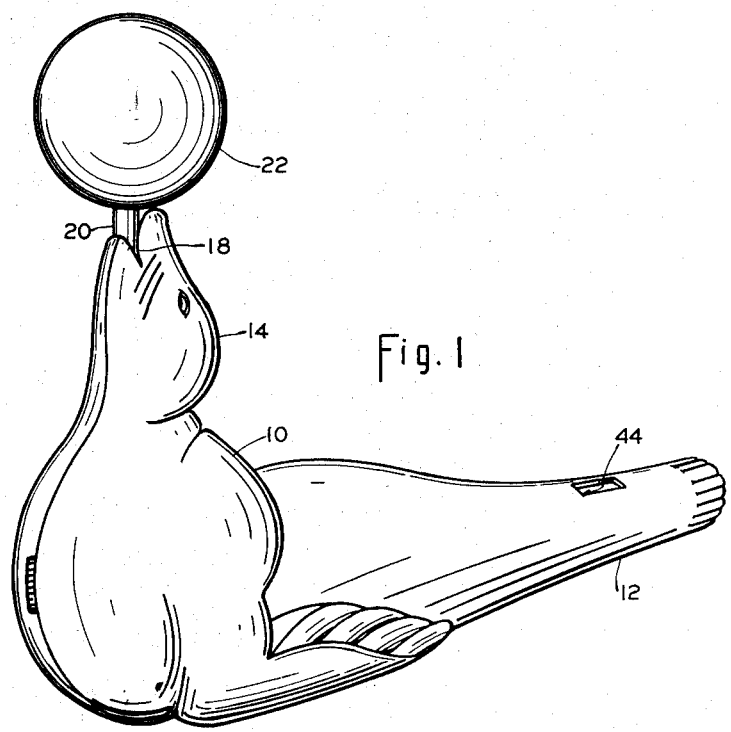
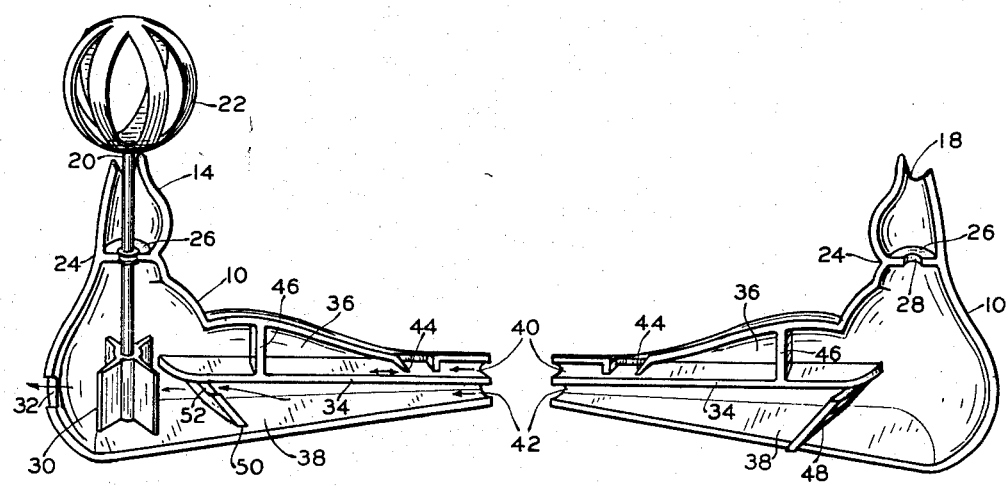
INVENTOR.
SAUL STONE
BY Chas. R. Fay, atty.

United States Patent Office 2,702,964
Patented Mar. 1, 1955

2,702,964

JET OPERATED ANIMATED WHISTLE

Saul Stone, Fitchburg, Mass.

Application September 23, 1953, Serial No. 381,806

2 Claims. (Cl. 46—56)

This invention relates to a combined whistle and amusement device, and the principal object of the invention resides in the provision of a device which is made in the shape of and to imitate a seal holding a ball on his nose similar to live exhibitions given at circuses, etc., there being means provided for rotating said ball by blowing the breath into the far end of the device representing the seal's tail; and in combination with a whistle such that the operator with a single breath, will cause the whistle to blow and the ball to rotate simultaneously.

Other objects and advantages of the invention will appear hereinafter.

Reference is to be had to the accompanying drawings, in which

Fig. 1 is a view in side elevation illustrating the invention;

Fig. 2 is an interior view showing one-half part of the device including the ball;

Fig. 3 is a view showing the other one-half part of the device from the interior thereof.

The figure represented by the reference numeral 10 is that of a seal which has a body portion, a tail portion 12, and a head 14, the latter being at right angles to the tail portion and being up-tilted to cause the nose thereof to point vertically. The mouth of the seal at 18 is slightly open and protruding therefrom there is an end of a shaft 20 to which is fixed a ball 22. The ball 22 may be solid, or made of open work, and it may be of any material.

Referring now to Figs. 2 and 3, it will be seen that the body of the seal comprises a pair of concave molded parts which when cemented together, form the body which is hollow. The neck of the seal at the position indicated by reference numeral 24 is somewhat restricted and is provided in each half part with a web or the like 26 each having a notch 28. These notches are complementary, forming a bearing for the shaft 20 and providing a restricted portion, so that the shaft 20 cannot be shifted relative thereto in an axial direction.

The body of the seal is hollow as clearly shown and contains the lower end of shaft 20 which has fixed thereto a paddle wheel 30. This paddle wheel is adapted to be rotated by the breath of the operator in order to rapidly rotate the shaft and the ball. The body of the seal may be provided with a front opening 32 for the exit of the breath which has caused the paddle 30 to rotate.

The interiors of the half-parts of the seal are ribbed as shown, including central longitudinal ribs 34 in each half which abut and form two completely separate chambers 36 and 38. That is, the hollow portions as indicated in Figs. 2 and 3, when juxtaposed, form the aforesaid separate chambers. Each of these chambers is provided with its own separate entrance as indicated at 40 and 42. The chamber 36 is provided with a whistle edge and opening generally indicated at 44, so that when the breath is blown in through the opening 40, the whistle will blow and the same breath of course may be blown into opening 42, causing the paddle to turn and rapidly rotate ball 22 as the whistle blows.

Partitions 46 abut to close off the whistle compartment, so that the air will emerge through the whistle aperture. In the lower compartment 38, one of the ribs, such as that at 48, extends outwardly from the plane of the part shown in Fig. 3 to inter-fit in a recess in the rib 50 to close this portion of chamber 38, leaving an aperture 52 which is to one side of the shaft 20, so that the force of the breath passing through chamber 38 into the body of the seal impinges upon the paddle wheel to one side of the axis of shaft 20 to ensure rotation thereof.

Having thus described my invention and the advantages thereof, I do not wish to be limited to the details herein disclosed, otherwise than as set forth in the claims, but what I claim is:

1. A child's amusement device comprising a simulated live figure having a horizontal body and tail portion and a forward head portion located substantially at right angles to the body portion, said head portion having an open mouth, a shaft within the forward head portion and extending out through said mouth, means holding the shaft against axial movement within said forward portion, a paddle at the lower end of said shaft within said body portion, an air chamber extending throughout said body portion from the tail of the figure and providing a passage for the breath to be blown to impinge upon said paddle to rotate the shaft, said body portion having an air inlet opening at the tail and an air exit opening positioned to provide for escape of air blown into the chamber after rotating the shaft.

2. A child's amusement device comprising a simulated seal having a horizontal body and tail portion and a forward head portion located at right angles to the body portion, said head portion having an open mouth, a shaft within the forward head portion and extending out through said mouth, means holding the shaft against axial movement within said forward portion, a paddle at the lower end of said shaft within said body portion, an air chamber having air inlet and exit openings and extending throughout said body portion from the tail of the seal and providing a passage for the breath to be blown to impinge upon said paddle to rotate the shaft, a closed chamber associated with said inlet opening, and a whistle in a wall of said closed chamber.

References Cited in the file of this patent

UNITED STATES PATENTS

| | | |
|---|---|---|
| 245,452 | Converse | Aug. 9, 1881 |
| 1,266,790 | Girard | May 21, 1918 |
| 2,404,186 | Mariani | July 16, 1946 |
| 2,425,212 | Strumor | Aug. 5, 1947 |